(12) United States Patent
Hain (10) Patent No.: US 7,406,417 B1
(45) Date of Patent: Jul. 29, 2008

(54) METHOD FOR CONDITIONING A DATABASE FOR AUTOMATIC SPEECH PROCESSING

(75) Inventor: Horst-Udo Hain, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 888 days.

(21) Appl. No.: 10/069,941

(22) PCT Filed: Aug. 29, 2000

(86) PCT No.: PCT/DE00/02940

§ 371 (c)(1),
(2), (4) Date: Jun. 19, 2002

(87) PCT Pub. No.: WO01/18792

PCT Pub. Date: Mar. 15, 2001

(30) Foreign Application Priority Data

Sep. 3, 1999 (DE) ................. 199 42 178

(51) Int. Cl.
*G10L 13/08* (2006.01)
(52) U.S. Cl. .................... 704/260; 704/266
(58) Field of Classification Search ............ 704/10, 704/200, 259, 260, 236, 266
See application file for complete search history.

(56) References Cited

U.S. PATENT DOCUMENTS 6,304,845 B1  10/2001  Hünlich et al.
6,411,932 B1 *  6/2002  Molnar et al. ............... 704/260

FOREIGN PATENT DOCUMENTS

| DE | 68913669 T2 | 7/1994 |
| DE | 197 51 123 | 6/1999 |
| EP | 372 734 | 6/1990 |
| WO | 99/40568 | 8/1999 |

OTHER PUBLICATIONS

Luk et al., "Inference of Letter-Phoneme Correspondences by Delimiting and Dynamic Time Warping Techniques", Proceedings of the International Conference on Acoustics, Speech and Signal Processing (ICASSP), vol. 17, Mar. 23, 1992, pp. 61-64.

(Continued)

*Primary Examiner*—Angela A Armstrong
(74) *Attorney, Agent, or Firm*—Staas & Halsey LLP (57) ABSTRACT

A neural network can be trained for synthesizing or recognizing speech with the aid of a database produced by automatically matching graphemes and phonemes. First, graphemes and phonemes are matched for words which have the same number of graphemes and phonemes. Next, graphemes and phonemes are matched for words that have more graphemes than phonemes in a series of steps that combine graphemes with preceding phonemes. Then, graphemes and phonemes are matched for words that have fewer graphemes than phonemes. After each step, infrequent and unsuccessful matches made in the preceding step are are erased. After this process is completed, the database can be used to train the neural network and graphemes, or letters of a text can be converted into the corresponding phonemes with the aid of the trained neural network.

26 Claims, 2 Drawing Sheets

OTHER PUBLICATIONS

Oakey et al., "Inductive Learning of Pronunciation Rules by Hypothesis Testing and Correction", Proceedings of the 7th Joint Conference on Artificial Intelligence IJCA1-81, Aug. 24-28, 1981, pp. 109-114.

Torkkola et al., "Dynamically Expanding Context vs. Multi-Layered Networks in Correction of Phoneme Strings", Proceedings of the Expert Systems Applications World Conference, IITT International, vol. Conf. 1, 1989, pp. 333-337.

Dutoit, "Introduction to Text-to-Speech Synthesis", 1997, Kluwers Academic XP002157980, paragraph 5.4.3.

* cited by examiner

METHOD FOR CONDITIONING A DATABASE FOR AUTOMATIC SPEECH PROCESSING

CROSS REFERENCE TO RELATED APPLICATIONS

This application is based on and hereby claims priority to German Application No. 19942178.1 filed on 3 Sep. 1999, the contents of which are hereby incorporated by reference.

BACKGROUND OF THE INVENTION

1. Field of the Invention

The invention relates to a method for conditioning a database for automatic speech processing, as well as a method for training a neural network for assigning graphemes to phonemes for automatic speech processing, and a method for assigning graphemes to phonemes in the synthesization of speech or in the recognition of speech.

2. Description of the Related Art

It is known to use neural networks for synthesizing speech, the neural networks converting a text, which is represented in a sequence of graphemes, into phonemes which are converted into the corresponding acoustic sounds by an appropriate speech output device. Graphemes are letters or combinations of letters which in each case are assigned a sound, the phoneme. The neural network must be trained before being used for the first time. This is normally performed by using a database which contains the grapheme/phoneme assignments, it being established thereby which phoneme is assigned to which grapheme.

The setting up of such a database constitutes a substantial outlay on time and mental effort, since databases of this type can usually only be constructed with the aid of a language expert.

SUMMARY OF THE INVENTION

The object of the invention is to create a method with the aid of which it is possible in a simple way to set up a database containing grapheme/phoneme assignments.

The method according to the invention for conditioning a database for automatic speech processing procedes from a database which contains words in the form of graphemes and phonemes. Such databases already exist for most languages. The databases are dictionaries which contain the words in script (graphemes) and in phonetic transcription (phonemes). However, these databases lack the assignment of the individual phonemes to the corresponding graphemes. This assignment is executed automatically according to the invention by the following steps:

a) assigning the graphemes to the phonemes of all the words which have the same number of graphemes and phonemes, the graphemes and phonemes being assigned to one another in pairs, b) assigning the graphemes to the phonemes of all the words which have more graphemes than phonemes, all the graphemes firstly being assigned to the phonemes in pairs until an assignment error arises on the basis of the assignments determined hitherto, or there are present only at the end of the word one or more graphemes to which no phoneme is assigned, and combining a plurality of graphemes to form a grapheme unit and assigning a grapheme to the phoneme unit, and c) assigning the graphemes to the phonemes of all the words which have fewer graphemes than phonemes, a plurality of phonemes being combined to form a phoneme unit, and a single grapheme being assigned to them in such a way that the remaining grapheme/phoneme assignments of the word to be analyzed correspond to the assignments found under a) and b), d) assigning the words hitherto not assignable, the words being examined in terms of the phoneme units determined under c) and/or the grapheme units determined under b), and the phonemes are assigned to the graphemes while taking account of the phoneme unit and/or grapheme units, and there being executed at least after step a) a correction step with the aid of which assignments of words which contradict the further assignments determined in step a) are erased.

According to the invention, the first step is to examine words which have the same number of graphemes and phonemes. The graphemes of these words are assigned to the phonemes in pairs, the assignments of the words which contradict the further assignments being erased in a correction step following thereupon.

A large number of the words can be processed with the aid of this first assignment operation and, in addition, statistically significant assignments can be achieved which permit checking in the correction step and which also permit checking of the further assignments to be set up in the subsequent steps.

Thereafter, those words are examined in the case of which the number of phonemes differs from the number of graphemes. In the case of words with more graphemes than phonemes, a plurality of graphemes are combined to form grapheme units, and phonemes are combined to form phoneme units in the case of words with fewer graphemes than phonemes.

After termination of these steps, the words not hitherto assignable are examined, account being taken in this case of the determined phoneme units and/or the determined grapheme units.

Consequently, the method according to the invention is used to set up step by step an "assignment knowledge" which is based initially on pairwise grapheme/phoneme assignments and into which grapheme units and phoneme units are also incorporated in the course of the method.

The method according to the invention can be applied to any desired language for which there already exists an electronically readable database which contains words in the form of graphemes and phonemes, there being no need for an assignment between the phonemes and graphemes. The use of expert knowledge is not necessary, since the method according to the invention is executed fully automatically.

It is then possible to use the database set up according to the invention to train a neural network with the aid of which the grapheme/phoneme assignments are executed automatically in synthesizing or recognizing speech.

BRIEF DESCRIPTION OF THE DRAWINGS

These and other objects and advantages of the present invention will become more apparent and more readily appreciated from the following description of the preferred embodiments, taken in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The method according to the invention serves for conditioning a database for speech synthesis, the starting point being an initial database that contains words in the form of graphemes and phonemes. Such an initial database is any dictionary that contains words both in script (grapheme) and in phonetic transcription (phonemes). However, these dictionaries do not contain an assignment of the individual graphemes to the respective phonemes. The purpose and aim of the method according to the invention is to set up such an assignment.

Figure 1:
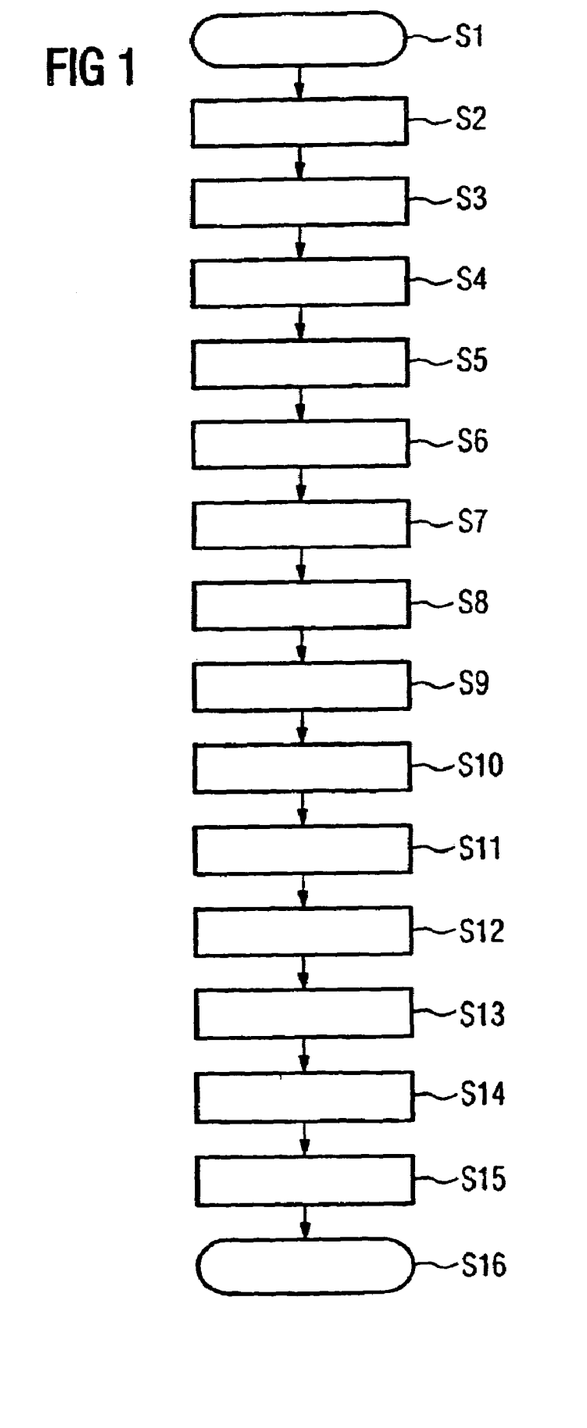
FIG. 1 is a flowchart of an exemplary embodiment of the method according to the invention.

An exemplary embodiment of the method according to the invention is illustrated in a flowchart in FIG. 1. The method is started in a step S1.

Step S2 examines all words that have the same number of graphemes and phonemes. The graphemes of these words are assigned to the corresponding phonemes in pairs.

Such a pairwise assignment is executed, for example, for the English word "run", which can be represented in the following way with the aid of its graphemes and phonemes:

Graphemes: r u n
Phonemes: r A n

In the case of "run", the grapheme "r" is assigned to the phoneme "r", the grapheme "u" to the phoneme "A", and the grapheme "n" to the phoneme "n". In the case of this pairwise assignment, each individual grapheme is therefore respectively assigned to a single phoneme. This is executed for all words that have the same number of phonemes and graphemes.

In the subsequent step S3, a correction is executed which erases the assignments of the words that contradict the further assignments determined in step S2. For this purpose, the frequencies of the individual grapheme/phoneme assignments are detected, and grapheme/phoneme assignments which only seldom occur are erased. If the frequency of a specific grapheme/phoneme assignment is below a predetermined threshold value, the corresponding grapheme/phoneme assignments are erased. The threshold value is, for example, in the range of frequency from 10 to 100. The threshold value can be adjusted as appropriate depending on the size of the vocabulary of the initial database, a higher threshold value being expedient in the case of larger initial databases than in the case of smaller initial databases.

An example of such a contradictory grapheme/phoneme assignment is the English word "fire":

Graphemes: f i r e
Phonemes: f l @ r

The assignment of the grapheme "r" to the phoneme "@", and the assignment of the grapheme "e" to the phoneme "r" are incorrect. These two assignments occur very seldom, for which reason their frequency is lower than the threshold value, and so they are erased in step S3. In addition, the word "fire" is marked again in step S3 as non-assigned, so that it can be re-examined in a later assignment step.

Words which have more graphemes than phonemes are examined in step S4, in each case one grapheme being assigned to one phoneme in the reading direction (from left to right), and the remaining graphemes being combined to form a grapheme unit with the last grapheme that has been assigned to a phoneme. The example of a word that is correctly assigned in this way is the English word "aback":

Graphemes: a b a ck
Phonemes: x b @ k

In step S5 following thereupon, a correction is executed in turn with the aid of which assignments are erased that contradict the assignments determined hitherto, that is to say assignments that have only a low frequency. Step S5 is therefore identical to step S3.

In step S6, the words that have more graphemes than phonemes and could not be correctly assigned in step S4 are examined anew, an individual grapheme being assigned in each case to an individual phoneme in the reading direction (from left to right). Each individual assignment is checked as to whether it corresponds to the assignments determined hitherto. If this checking reviews that a grapheme/phoneme assignment does not correspond to the previous assignments, that is to say does not have the required frequency, the method reverts to the last grapheme/phoneme assignment and joins the grapheme of this grapheme/phoneme assignment to the next grapheme in the reading direction to form a grapheme unit. The remaining phonemes and graphemes are then assigned to one another again individually, each individual grapheme/phoneme assignment being checked, in turn.

One or more grapheme units can be generated inside a word during this method step, the grapheme units comprising two graphemes as a rule. However, it is also possible that the grapheme units can comprise three or more graphemes.

A word in which step S6 leads to a successful assignment is, for example, the English word "abasement":

Graphemes: a b a se m e n t
Phonemes: x b e s m i n t

In the case of "abasement", the pairwise assignment proceeds correctly up to the grapheme "e", which is firstly assigned to the phoneme "m". This assignment contradicts the assignments determined hitherto, for which reason the method converts to the last successful assignment of the grapheme "s" to the phoneme "s", and joins the graphemes "s" with the grapheme "e" to form the grapheme unit "se". The further pairwise assignment of the graphemes to the phonemes corresponds again to the assignments determined hitherto, for which reason they are executed correspondingly.

The words that were examined in step S6 and have not been assigned with complete success are marked in step s7, and their assignments are erased, in turn.

In step S8, the words that have more graphemes than phonemes and could not be correctly assigned in steps S4 and S6 are examined anew, an individual grapheme being assigned in each case to an individual phoneme firstly in the reading direction (from left to right). Each individual assignment is checked, in turn, as to whether it corresponds to the assignments determined hitherto. If this check shows that a grapheme/phoneme assignment does not correspond to the previous assignments, that is to say that the number of the frequency is below the predetermined threshold value, individual graphemes are assigned to individual phonemes counter to the reading direction (from right to left). If, in the case of this method, only one phoneme is left over that cannot be assigned a grapheme, the remaining graphemes are combined to form a grapheme unit and assigned to the one phoneme.

A grapheme unit can be generated inside a word in this method step.

A word in the case of which step S8 leads to a successful assignment is, for example, the English word "amongst":

Graphemes: a m o ng s t
Phonemes: x m A G s t

In the case of "amongst", the pairwise assignment from left to right is performed correctly up to the grapheme "n", which is firstly assigned to the phoneme "G". This assignment contradicts the assignments determined hitherto, for which reason a pairwise assignment is executed from right to left. This assignment proceeds correctly up to the grapheme "g", which is initially assigned to the phoneme "G". This assignment contradicts the assignment determined hitherto. The phoneme "G" is left over as the only phoneme that cannot be assigned to a grapheme. This phoneme "G" is now assigned to the remaining graphemes "n" and "g", which are combined to form a grapheme unit.

The words examined in step S8, which have not been assigned with complete success, are marked in step S9 and their assignments are erased, in turn.

The words that have fewer graphemes than phonemes are examined in step S10, the individual graphemes being assigned in pairs to the individual phonemes, the graphemes also being assigned to the phonemes adjacent to the assigned phonemes. The respective frequency of all these assignments is determined, and if it is established that a grapheme can be assigned to the two adjacent phonemes with a high frequency, these two phonemes are combined to form a phoneme unit if the two phonemes are two vowels or two consonants.

A word in which step S10 leads to a correct assignment is, for example, the English word "axes":

Graphemes: a x e s
Phonemes: @ ks i z

In the case of "axes", the assignments of the grapheme "x" to the phonemes "k" and "s" respectively yields a frequency that is above a predetermined threshold value, so that these two phonemes are combined to form the phoneme unit "ks". The remaining graphemes and phonemes are assigned in pairs, in turn.

It is also possible in step S10 that a plurality of phoneme units are formed, or that the phoneme units also comprise more than two phonemes.

A correction is carried out in turn in step S11 in the case of which the assignments that seldom occur are erased, and the words in which these contradictory assignments have been established are marked as non-assigned. Step S11 corresponds essentially to steps S3 and S5, although in this case account is also taken of the grapheme/phoneme assignments determined up to step S10.

Step S12 corresponds essentially to step S10, that is to say phoneme units are formed from adjacent phonemes, the phoneme units not being limited in step S12 to two consonants or two vowels, but also being capable of containing a mixture of vowels and consonants.

A correction operation that corresponds to step S11 is carried out in turn in step S13, account being taken of all grapheme/phoneme assignments determined in the interim.

The phoneme units determined in steps S10 and S12 are used in step S14 in order to re-examine words whose graphemes could not be correctly assigned to the phonemes, use being made, for adjacent phonemes, of a phoneme unit that exists for them already. It is also possible as an option to take account of the previously determined grapheme units. Should no use be made of this option, grapheme units can be formed here anew in accordance with the methods according to steps S4, S6 and S8.

A word that shows the assignment in accordance with step S14 is the English word "accumulated":

Graphemes: a cc u m u l a t e d
Phonemes: x k yu m yx l e t l d

In the case of this word, the phonemes "y" and "u" or "y" and "x" are initially replaced by the phoneme units "yu" and "yx", respectively. Since these phoneme units have already been determined in the preceding steps, use is made in step S14 of the option that it is also possible to take account of the grapheme units, and so the grapheme unit "cc" is used for the two graphemes "c" and "c". The pairwise assignments of the individual graphemes or grapheme units to the individual phonemes or phoneme units yields a correct assignment.

If no use is made of the option of taking account of the grapheme units then, as is the case in step S6, the individual graphemes are assigned to the individual phonemes or phoneme units, an assignment contradicting the previous assignments occurring in the present case with the assignment of the grapheme "c" to the phoneme unit "yu". This contradictory assignment is established, and the grapheme "c" is combined with the preceding grapheme "c" to form "cc". This leads, in turn, to a correct assignment of the graphemes to the phonemes.

A check is made, in turn, in step S15 as to whether contradictory assignments have arisen. If such contradictory assignments are established, they are erased together with the further assignments of the respective word.

The method is terminated with the step S16.

The number of the contradictory assignments determined in step S15 is a feature of the quality of the conditioning of the initial database, obtained by the method, with the individual grapheme/phoneme assignments.

It was already possible for the method according to the invention to be used very successfully in automatically setting up a database for the German language, an assignment database with a total of 47 phonemes and 92 graphemes having been constructed. In setting up the database for the English language, which has a substantially more complicated grapheme/phoneme assignment, 62 phonemes and 222 graphemes resulted whose assignments are not as good as in the case of the German language. The larger number of graphemes in the English language complicates their processing. It can therefore be expedient to introduce a zero phoneme, that is to say a phoneme without a sound. Such a zero phoneme can be assigned, for example, to the English grapheme unit "gh", which occurs in the English language in a voiceless fashion in combination with the graphemes "ei", "ou" and "au". If no such zero phoneme was introduced, it would be necessary for the phonemes "eigh", "ough" and "augh" to be introduced in addition to the graphemes "ei", "ou" and "au". The zero phoneme permits a reduction in the number of the graphemes, since "eigh", "ough" and "augh" can be replaced respectively by "ei", "ou" and "au" in combination with "gh". The reliability of the method can be raised thereby. In particular, a smaller number of phonemes and/or graphemes permits a simpler, faster and more reliable application in the case of a neural network that is trained by the database set up with the aid of the method according to the invention.

Figure 2:
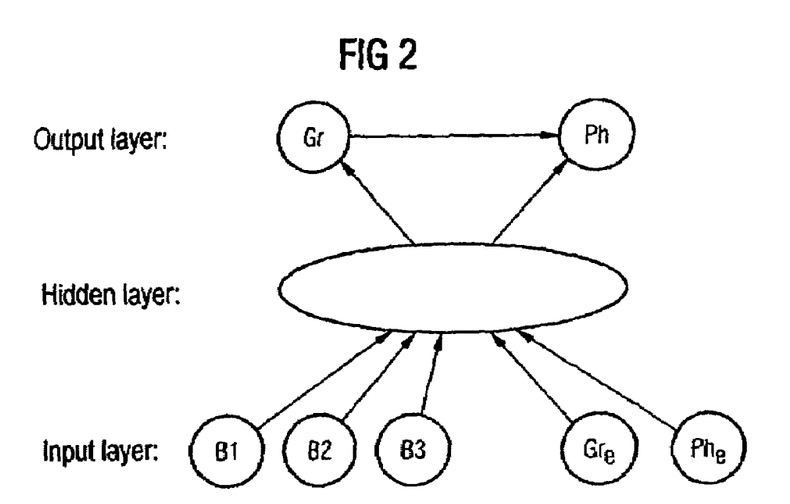
FIG. 2 is a block diagram of a neural network for assigning graphemes to phonemes.

Such a neural network, which has five input nodes and two output nodes, is illustrated schematically in a simplified fashion in FIG. 2. Three consecutive letters B1, B2 and B3 of a word that is to be converted into phonemes are input at three of the five input nodes. There are two nodes on the output side, one of the two outputting the respective phoneme Ph, and the other node outputting a grouping Gr. The grouping $GR_1$ last output and the phoneme $Ph_1$ last output are input at the two further input nodes.

This network is trained with the words of the database conditioned using the method according to the invention, the grapheme/phoneme assignments of which database do not constitute a contradiction to the remaining grapheme/phoneme assignments, that is to say the words whose graphemes could be correctly assigned to the phonemes.

The neural network determines a phoneme for the middle letter B2 in each case, account being taken of the respectively preceding letter and subsequent letter in the context, and of the phoneme $Ph_1$ preceding the phoneme to be determined. If the two consecutive letters B2 and B3 constitute a grapheme unit, the result is an output of two for the grouping Gr. If the letter B2 is not a constituent of a grapheme unit consisting of a plurality of letters, a one is output as grouping Gr.

Account is taken of the respectively last grouping $Gr_1$ on the input side, no phoneme Ph being assigned to the middle letter B2 in the case of a grouping of $Gr_1$ of two, since this letter has already been taken into account with the last grapheme unit. The second letter of the grouping is skipped in this case.

During training of the neural network, the values for the input nodes and for the output nodes are, as is known per se, prescribed for the neural network, as a result of which the neural network acquires the respective assignments in the context of the words.

It can be expedient to provide more than three letters at the input side of the neural network, in particular in the case of languages such as the English language in which a plurality of letters are used to represent a single sound. For the German language it is expedient to provide three or five nodes at the input side for inputting letters, whereas for the English language five, seven or even nine nodes can be expedient for inputting letters. Grapheme units with up to five letters can be handled given nine nodes.

Once the neural network has been trained with the database according to the invention, it can be used for generating language automatically. A device for generating language in which the neural network according to the invention can be used is shown schematically in FIG. 3.

Figure 3:
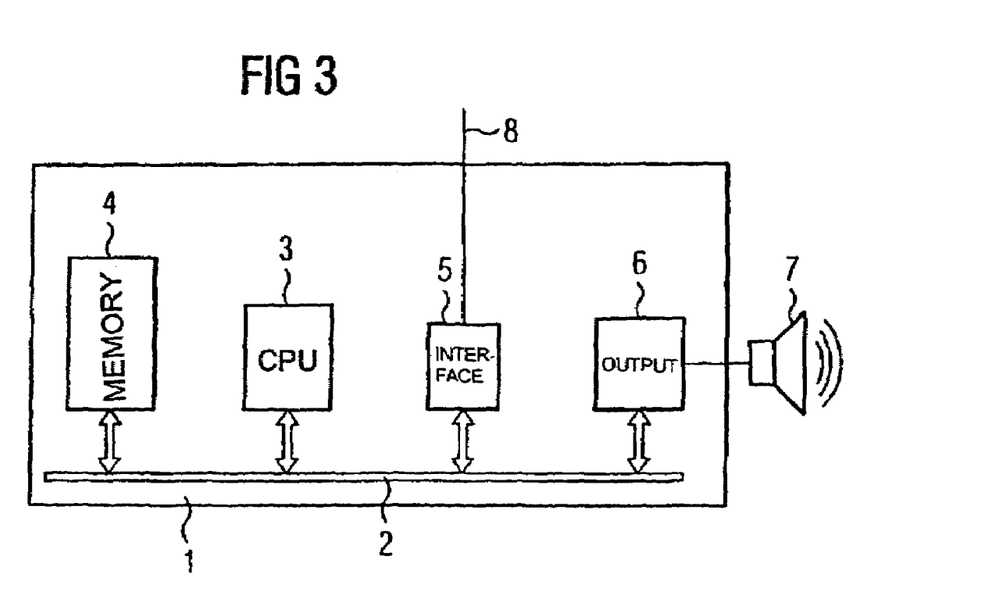
FIG. 3 is a block diagram of a device for carrying out the method according to the invention.

This device is an electronic data processing device 1 with an internal bus 2, to which a central processor unit 3, a memory unit 4, an interface 5 and an acoustic output unit 6 are connected. The interface 5 can make a connection to a further electronic data processing device via a data line 8. A loudspeaker 7 is connected to the acoustic output unit 6.

The neural network according to the invention is stored in the memory unit 4 in the form of a computer program that can be run by the central processor unit 3. A text which is fed to the electronic data processing device in any desired way, for example, via the interface 5, can then be fed with the aid of an appropriate auxiliary program to the neural network that converts the graphemes or letters of the text into corresponding phonemes. These phonemes are stored in a phoneme file that is forwarded via the internal bus 2 to the acoustic output unit 6 with the aid of which the individual phonemes are converted into electric signals that are converted into acoustic signals by the loudspeaker 7.

The method according to the invention for conditioning a database can also be designed with the aid of such an electronic processing device 1, the method being stored, again, in the form of a computer program in the memory 4, and being run by the central processor unit 3, in which case it conditions an initial database that represents a dictionary in script and phonetic transcription, into a database in which the individual sounds, the phonemes, are assigned to the individual letters or letter combinations, the graphemes.

The assignment of the individual graphemes to the individual phonemes can be stored in the conditioned database by blank characters that are inserted between the individual phonemes and graphemes.

The computer programs representing the method according to the invention and the neural network can also be stored on any desired electronically readable data media, and thus be transmitted to a further electric data processing device.

The invention is described above with the aid of an exemplary embodiment with the aid of which a database for speech synthesis is generated. Of course, it is also possible within the scope of the invention to use the database generated according to the invention in speech recognition, since speech recognition methods frequently use databases with grapheme/phoneme assignments.

Speech recognition can be executed, for example, with the aid of a neural network that has been trained with the database set up according to the invention. At the input side, this neural network preferably has three input nodes at which the phoneme converted into a grapheme is input and, if it is present, at least one phoneme preceding in the word and one subsequent phoneme are input. At the output side, the neural network has a node at which the grapheme assigned to the phoneme is output.

Thus, the scope of the invention covers any application of the setting up and use of the database set up according to the invention in the field of automatic speech processing.

The invention has been described in detail with particular reference to preferred embodiments thereof and examples, but it will be understood that variations and modifications can be effected within the spirit and scope of the invention.

The invention claimed is:

1. A method for conditioning a database of words formed of graphemes and phonemes, for automatic speech processing using the database, said method comprising:
   automatically assigning the graphemes to the phonemes to form grapheme/phoneme pairs for the words in the database having an identical number of graphemes and phonemes;
   automatically assigning the graphemes to the phonemes for each word in the database having more graphemes than phonemes, to form grapheme/phoneme pairs until an assignment error is detected based on previously determined assignments, or no phonemes remain for the word, then combining a plurality of graphemes in the word to form a grapheme unit and assigning the grapheme unit to one of the phonemes;
   automatically assigning the graphemes to the phonemes for each word in the database having fewer graphemes than phonemes, by assigning a single grapheme in the word to a plurality of phonemes combined to form a phoneme unit, with remaining graphemes and phonemes in the word corresponding to previously assigned grapheme/phoneme pairs;
   automatically reexamining remaining words for previously determined grapheme/phoneme pairs and at least one of phoneme units and grapheme units determined previously;
   automatically erasing, at least after said assigning for the words in the database having an identical number of graphemes and phonemes, any assignment which contradicts another assignment determined to be valid; and
   generating, from the database, individual phonemes and storing the individual phonemes in a phoneme file.

2. The method as claimed in claim 1, wherein said erasing is performed after said assigning is performed for all the words in the database having more graphemes than phonemes and after said assigning is performed for all the words in the database having fewer graphemes than phonemes.

3. The method as claimed in claim 2, further comprising determining assignments to be valid for each grapheme/phoneme pair having a frequency of occurrence above a predetermined threshold value.

4. The method as claimed in claim 3, further comprising removing each word in a list of completed words, containing an assignment subjected to said erasing.

5. The method as claimed in claim 4, wherein said assigning for words having fewer graphemes than phonemes uses phoneme units that do not combine a vowel with a consonant.

6. The method as claimed in claim 4, wherein said assigning for words having fewer graphemes than phonemes first uses phoneme units that do not combine a vowel with a consonant and, if any words having fewer graphemes than phonemes remain, then uses phoneme units combining vowels with consonants.

7. The method as claimed in claim 4, wherein said assigning of the graphemes to the phonemes for words having more graphemes than phonemes comprises:
    assigning graphemes and phonemes to form the grapheme/phoneme pairs, starting from one end of each word until a last assigned grapheme is assigned to a final phoneme;
    combining each unassigned grapheme with the last assigned grapheme to form an ending grapheme unit; and
    assigning the ending grapheme unit to the final phoneme of the word.

8. The method as claimed in claim 7, wherein said assigning of the graphemes to the phonemes for words having more graphemes than phonemes further comprises:
    assigning the graphemes and the phonemes to form the grapheme/phoneme pairs, from a first end of each word towards a second end of the word, until a first assignment contradiction is detected based on previous assignments determined to be valid;
    combining a last grapheme in a longest chain of graphemes free of assignment contradictions with a first unassigned grapheme to form an intermediate grapheme unit;
    assigning the intermediate grapheme unit to a last assigned phoneme in the longest chain; and
    continuing said assigning of the graphemes and the phonemes to form the grapheme/phoneme pairs while checking for another assignment contradiction and, each time a next unassigned grapheme, immediately following the intermediate grapheme unit, produces another assignment contradiction, adding the next unassigned grapheme to the intermediate grapheme unit and reassigning the intermediate grapheme unit to the last assigned phoneme in the longest chain.

9. The method as claimed in claim 8, further comprising for each of the words in which said continuing is unable to resolve all assignment contradictions:
    using said assigning of the graphemes and the phonemes to form the grapheme/phoneme pairs from the first end of the word to the first assignment contradiction;
    assigning the graphemes and the phonemes to form the grapheme/phoneme pairs, from the second end of the word towards the first end of the word, until a single unassigned phoneme remains;
    combining all unassigned graphemes in the word to form a single grapheme unit; and
    assigning the single grapheme unit to the single unassigned phoneme.

10. A method for training a neural network to assign graphemes to phonemes for automatic speech processing, comprising:
    conditioning a database of words formed of graphemes and associated phonemes comprising:
        assigning the graphemes to the phonemes to form grapheme/phoneme pairs for the words in the database having an identical number of graphemes and phonemes;
        assigning the graphemes to the phonemes for each word in the database having more graphemes than phonemes, to form grapheme/phoneme pairs until an assignment error is detected based on previously determined assignments, or no phonemes remain for the word, then combining a plurality of graphemes in the word to form a grapheme unit and assigning the grapheme unit to one of the phonemes;
        assigning the graphemes to the phonemes for each word in the database having fewer graphemes than phonemes, by assigning a single grapheme in the word to a plurality of phonemes combined to form a phoneme unit, with remaining graphemes and phonemes in the word corresponding to previously assigned grapheme/phoneme pairs;
        reexamining remaining words for previously determined grapheme/phoneme pairs and at least one of phoneme units and grapheme units determined previously; and
        erasing, at least after said assigning for the words in the database having an identical number of graphemes and phonemes, any assignment which contradicts another assignment determined to be valid;
    training the neural network by inputting the graphemes at input nodes and the associated phonemes at an output node of the neural network for at least some of the words in the database; and
    generating, from the database, individual phonemes and storing the individual phonemes in a phoneme file.

11. The method as claimed in claim 10, wherein said erasing is performed after said assigning is performed for all the words in the database having more graphemes than phonemes and after said assigning is performed for all the words in the database having fewer graphemes than phonemes.

12. The method as claimed in claim 11, further comprising determining assignments to be valid for each grapheme/phoneme pair having a frequency of occurrence above a predetermined threshold value.

13. The method as claimed in claim 12, further comprising removing each word in a list of completed words, containing an assignment subjected to said erasing.

14. The method as claimed in claim 13, wherein said assigning for words having fewer graphemes than phonemes uses phoneme units that do not combine a vowel with a consonant.

15. The method as claimed in claim 13, wherein said assigning for words having fewer graphemes than phonemes first uses phoneme units that do not combine a vowel with a consonant and, if any words having fewer graphemes than phonemes remain, then uses phoneme units combining vowels with consonants.

16. The method as claimed in claim 13, wherein said assigning of the graphemes to the phonemes for words having more graphemes than phonemes comprises:
    assigning graphemes and phonemes to form the grapheme/phoneme pairs, starting from one end of each word until a last assigned grapheme is assigned to a final phoneme;
    combining each unassigned grapheme with the last assigned grapheme to form an ending grapheme unit; and
    assigning the ending grapheme unit to the final phoneme of the word.

17. The method as claimed in claim 16, wherein said assigning of the graphemes to the phonemes for words having more graphemes than phonemes further comprises:
    assigning the graphemes and the phonemes to form the grapheme/phoneme pairs, from a first end of each word towards a second end of the word, until a first assignment contradiction is detected based on previous assignments determined to be valid;

combining a last grapheme in a longest chain of graphemes free of assignment contradictions with a first unassigned grapheme to form an intermediate grapheme unit;

assigning the intermediate grapheme unit to a last assigned phoneme in the longest chain; and continuing said assigning of the graphemes and the phonemes to form the grapheme/phoneme pairs while checking for another assignment contradiction and, each time a next unassigned grapheme, immediately following the intermediate grapheme unit, produces another assignment contradiction, adding the next unassigned grapheme to the intermediate grapheme unit and reassigning the intermediate grapheme unit to the last assigned phoneme in the longest chain.

18. The method as claimed in claim 17, further comprising for each of the words in which said continuing is unable to resolve all assignment contradictions:

using said assigning of the graphemes and the phonemes to form the grapheme/phoneme pairs from the first end of the word to the first assignment contradiction;

assigning the graphemes and the phonemes to form the grapheme/phoneme pairs, from the second end of the word towards the first end of the word, until a single unassigned phoneme remains;

combining all unassigned graphemes in the word to form a single grapheme unit; and assigning the single grapheme unit to the single unassigned phoneme.

19. A computer-readable medium having stored thereon instructions for assigning graphemes to phonemes for synthesizing speech, comprising:

conditioning a database of words formed of graphemes and associated phonemes comprising:

assigning the graphemes to the phonemes to form grapheme/phoneme pairs for the words in the database having an identical number of graphemes and phonemes;

assigning the graphemes to the phonemes for each word in the database having more graphemes than phonemes, to form grapheme/phoneme pairs until an assignment error is detected based on previously determined assignments, or no phonemes remain for the word, then combining a plurality of graphemes in the word to form a grapheme unit and assigning the grapheme unit to one of the phonemes;

assigning the graphemes to the phonemes for each word in the database having fewer graphemes than phonemes, by assigning a single grapheme in the word to a plurality of phonemes combined to form a phoneme unit, with remaining graphemes and phonemes in the word corresponding to previously assigned grapheme/phoneme pairs;

reexamining remaining words for previously determined grapheme/phoneme pairs and at least one of phoneme units and grapheme units determined previously; and erasing, at least after said assigning for the words in the database having an identical number of graphemes and phonemes, any assignment which contradicts another assignment determined to be valid; and training a neural network by inputting the graphemes at input nodes and the associated phonemes at an output node of the neural network for at least some of the words in the database;

inputting, for each word to be synthesized, an input pattern formed of a letter to be assigned and, if present, at least one letter preceding the letter to be assigned and one subsequent letter in the word; and generating, from the neural network, an output pattern of one phoneme corresponding to the letter to be assigned.

20. The method as claimed in claim 19, wherein said inputting includes, when possible, a plurality of letters preceding and subsequent to the letter to be assigned.

21. The method as claimed in claim 20, wherein said inputting includes, when possible, three preceding letters and three subsequent letters.

22. The method as claimed in claim 21, wherein the input pattern includes, when possible, an immediately previous output pattern.

23. The method as claimed in claim 22, wherein the output pattern indicates a number of the letters combined to form the grapheme unit in the input pattern.

24. A computer-readable medium having stored thereon instructions for assigning phonemes to graphemes for recognition of speech, comprising:

conditioning a database of words formed of graphemes and associated phonemes comprising:

assigning the graphemes to the phonemes to form grapheme/phoneme pairs for the words in the database having an identical number of graphemes and phonemes;

assigning the graphemes to the phonemes for each word in the database having more graphemes than phonemes, to form grapheme/phoneme pairs until an assignment error is detected based on previously determined assignments, or no phonemes remain for the word, then combining a plurality of graphemes in the word to form a grapheme unit and assigning the grapheme unit to one of the phonemes;

assigning the graphemes to the phonemes for each word in the database having fewer graphemes than phonemes, by assigning a single grapheme in the word to a plurality of phonemes combined to form a phoneme unit, with remaining graphemes and phonemes in the word corresponding to previously assigned grapheme/phoneme pairs;

reexamining remaining words for previously determined grapheme/phoneme pairs and at least one of phoneme units and grapheme units determined previously; and erasing, at least after said assigning for the words in the database having an identical number of graphemes and phonemes, any assignment which contradicts another assignment determined to be valid; and training a neural network by inputting the phonemes at input nodes and the associated graphemes at an output node of the neural network for at least some of the words in the database;

inputting, to the neural network, an input pattern formed of at least a phoneme to be assigned and, if present, a preceding phoneme and a subsequent phoneme; and generating, from the neural network, an output pattern having one letter corresponding to the phoneme to be assigned.

25. An apparatus comprising:

a neural network causing a computer to execute a process comprising:

conditioning a database of words formed of graphemes and associated phonemes comprising:

assigning the graphemes to the phonemes to form grapheme/phoneme pairs for the words in the database having an identical number of graphemes and phonemes;

assigning the graphemes to the phonemes for each word in the database having more graphemes than phonemes, to form grapheme/phoneme pairs until an assignment error is detected based on previously determined assignments, or no phonemes remain for the word, then combining a plurality of graphemes in the word to form a grapheme unit and assigning the grapheme unit to one of the phonemes;

assigning the graphemes to the phonemes for each word in the database having fewer graphemes than phonemes, by assigning a single grapheme in the word to a plurality of phonemes combined to form a phoneme unit, with remaining graphemes and phonemes in the word corresponding to previously assigned grapheme/phoneme pairs;

reexamining remaining words for previously determined grapheme/phoneme pairs and at least one of phoneme units and grapheme units determined previously; and erasing, at least after said assigning for the words in the database having an identical number of graphemes and phonemes, any assignment which contradicts another assignment determined to be valid;

training the neural network by inputting the graphemes at input nodes and the associated phonemes at an output node of the neural network for at least some of the words in the database; and generating, from the neural network, an output pattern having one letter corresponding to the phoneme to be assigned.

26. An electronically readable data medium storing at least one computer program to control a processor to perform a method for conditioning a database of words formed of graphemes and phonemes for automatic speech processing using the database, said method comprising:

automatically assigning the graphemes to the phonemes to form grapheme/phoneme pairs for the words in the database having an identical number of graphemes and phonemes;

automatically assigning the graphemes to the phonemes for each word in the database having more graphemes than phonemes, to form grapheme/phoneme pairs until an assignment error is detected based on previously determined assignments, or no phonemes remain for the word, then combining a plurality of graphemes in the word to form a grapheme unit and assigning the grapheme unit to one of the phonemes;

automatically assigning the graphemes to the phonemes for each word in the database having fewer graphemes than phonemes, by assigning a single grapheme in the word to a plurality of phonemes combined to form a phoneme unit, with remaining graphemes and phonemes in the word corresponding to previously assigned grapheme/phoneme pairs;

automatically reexamining remaining words for previously determined grapheme/phoneme pairs and at least one of phoneme units and grapheme units determined previously;

automatically erasing, at least after said assigning for the words in the database having an identical number of graphemes and phonemes, any assignment which contradicts another assignment determined to be valid; and generating, from the database, individual phonemes and storing the individual phonemes in a phoneme file.

* * * * *